(12) United States Patent
Buchholz et al.

(10) Patent No.: US 9,513,803 B2
(45) Date of Patent: Dec. 6, 2016

(54) TAGGING IN A STORAGE DEVICE

(71) Applicant: Intel Corporation, Santa Clara, CA (US)

(72) Inventors: David A. Buchholz, Cameron Park, CA (US); Dennis M. Morgan, Pine Grove, CA (US)

(73) Assignee: Intel Corporation, Santa Clara, CA (US)

(*) Notice: Subject to any disclaimer, the term of this patent is extended or adjusted under 35 U.S.C. 154(b) by 208 days.

(21) Appl. No.: 13/724,198

(22) Filed: Dec. 21, 2012

(65) Prior Publication Data

US 2014/0181448 A1 Jun. 26, 2014

(51) Int. Cl.
*G06F 3/06* (2006.01)

(52) U.S. Cl.
CPC ........... *G06F 3/0604* (2013.01); *G06F 3/0637* (2013.01); *G06F 3/0688* (2013.01)

(58) Field of Classification Search
CPC .... G06F 3/062; G06F 3/0622; G06F 3/0623; G06F 3/0637; G06F 3/0683; G06F 3/0685; G06F 3/0686; G06F 3/0688; G06F 3/0689; G06F 21/62; G06F 2221/2107; G06F 2221/2141; G06F 12/1408; G06F 12/158; G06F 2212/402
See application file for complete search history.

(56) References Cited

U.S. PATENT DOCUMENTS

| | | | |
|---|---|---|---|
| 5,809,522 A * | 9/1998 | Novak et al. | 711/118 |
| 6,055,543 A * | 4/2000 | Christensen | G06F 17/30067 |
| 7,124,236 B1 | 10/2006 | Tan et al. | |
| 8,700,896 B1 * | 4/2014 | Sobel | 726/26 |
| 2002/0065988 A1 * | 5/2002 | Lasserre | G06F 1/206 711/122 |
| 2002/0129191 A1 * | 9/2002 | DaCosta | 711/103 |
| 2003/0061499 A1 * | 3/2003 | Durrant | 713/189 |
| 2004/0236745 A1 * | 11/2004 | Keohane et al. | 707/9 |
| 2005/0027946 A1 * | 2/2005 | Desai | 711/146 |
| 2005/0228952 A1 * | 10/2005 | Mayhew et al. | 711/133 |
| 2007/0005906 A1 * | 1/2007 | Miyamoto | 711/143 |
| 2009/0164738 A1 * | 6/2009 | Erfani et al. | 711/142 |
| 2010/0131697 A1 | 5/2010 | Alrod et al. | |
| 2011/0271353 A1 | 11/2011 | Li et al. | |
| 2011/0276799 A1 * | 11/2011 | Chung | 713/165 |
| 2012/0246408 A1 | 9/2012 | Yamamura et al. | |
| 2014/0115228 A1 * | 4/2014 | Zhou et al. | 711/102 |

FOREIGN PATENT DOCUMENTS

KR 10-2012-0058391 A 6/2012

OTHER PUBLICATIONS

International Search Report and Written Opinion Received for PCT Patent Application No. PCT/US2013/045541, mailed on Sep. 25, 2013, 12 pages.

\* cited by examiner

*Primary Examiner* — Michael Krofcheck
(74) *Attorney, Agent, or Firm* — Chapin Intellectual Property Law, LLC

(57) ABSTRACT

In an embodiment, a command issued by an entity may be acquired by a controller contained in a storage device. The command may be issued by the entity to access a block in the storage device. The entity may be associated with a tag that may identify the entity. The tag may be associated with the block. Information about the association between the tag and the block may be stored in the storage device.

20 Claims, 8 Drawing Sheets

TAGGING IN A STORAGE DEVICE

BACKGROUND

A computing device may use one or more storage systems to store information. The information may include, for example, data and/or executable instructions. The storage systems may include a primary storage and a secondary storage. A primary storage may be a storage that is directly accessible to a processor that may be contained in the computing device. The processor may access the primary storage via a memory bus that may contain provisions for transferring information between the processor and the primary storage. A secondary storage may be a storage that may not be directly accessible to the processor. Here, information may be transferred between the processor and the secondary storage via one or more input/output (I/O) channels that may be part of an I/O bus.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

A computing device may include a non-volatile storage device that the computing device may use to store information (e.g., data) that is to survive after power is lost to the computing device. For example, a computing device, such as a smart phone, tablet, or ultrabook, may contain a processor and a solid-state disk (SSD). The SSD may provide a non-volatile storage for storing information used by the computing device. The information may include, for example, data and/or applications that may be used by the computing device. By storing the information in the SSD, the information may be persisted such that the information may be retained after power is lost to the computing device. The processor may retrieve the persisted information from the SSD after power is restored to the computing device.

A non-volatile storage device, such as an SSD, may store information in physical blocks that may be contained in the non-volatile storage device. A processor associated with a computing device may access the information using a logical block address (LBA). The LBA may be an address of a logical block. The LBA may map to a physical block address (PBA) contained in the non-volatile storage device. The PBA may be an address that may be associated with a physical block that may be contained in the non-volatile storage device. A physical block in a non-volatile storage device may also be referred to as a physical page in the non-volatile storage device.

The non-volatile storage device may maintain a logical-to-physical (L2P) table, which the non-volatile storage device may use to translate LBAs to PBAs. The L2P table may be part of a context that may be maintained by the non-volatile storage device.

For example, suppose a computing device includes a processor and a non-volatile storage device. The processor may issue a command to read information in the non-volatile storage device. The processor may specify the location of the information in the command using an LBA. The non-volatile storage device may acquire (e.g., receive, read) the command and identify the physical location of the information by translating the LBA to a PBA using an L2P table that may be managed by the non-volatile storage device. Suppose the PBA points to a particular physical block contained in a non-volatile store in the non-volatile storage device. The non-volatile storage device may read information stored in the physical block and return the information to the processor.

Figure 1:
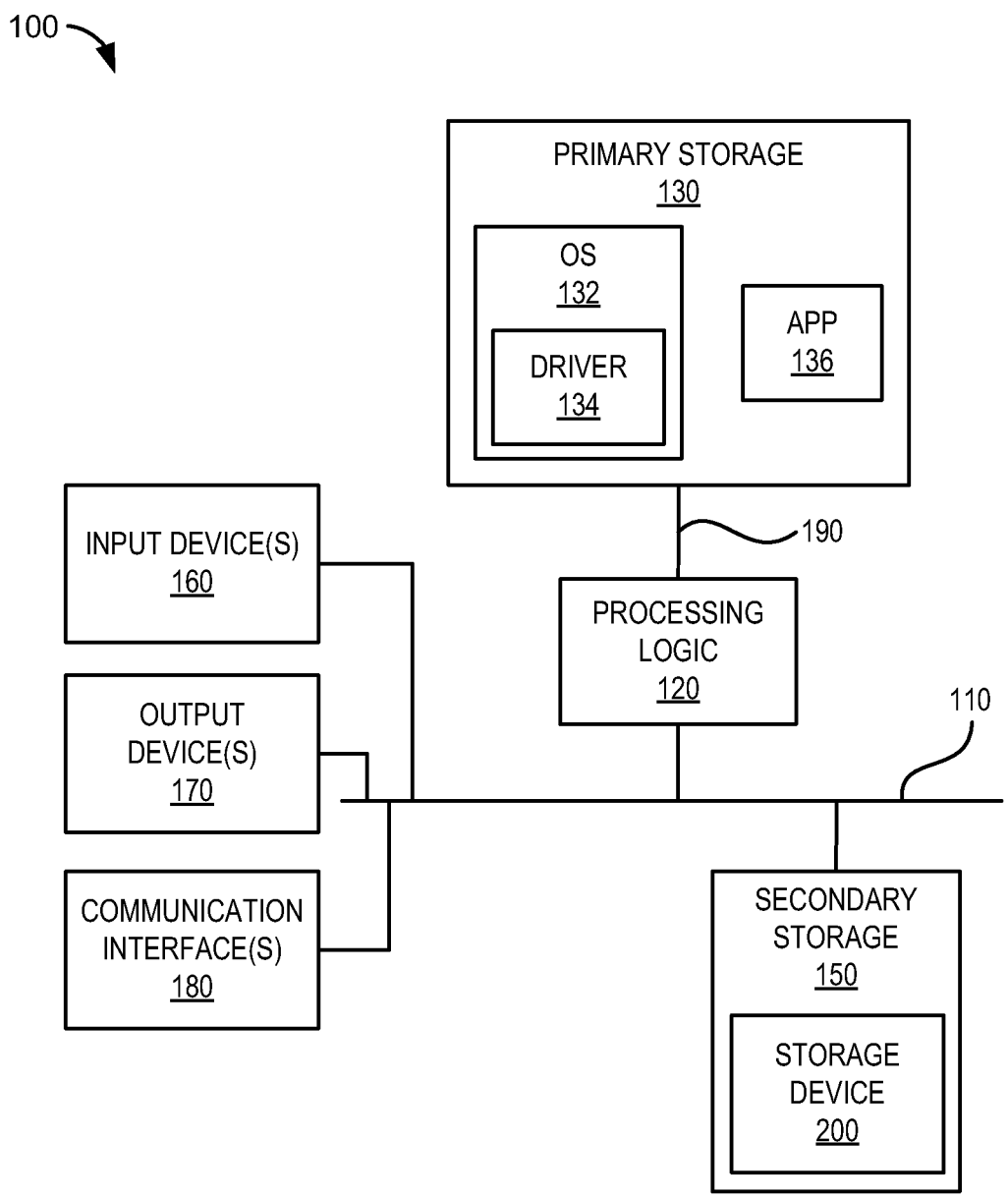
FIG. 1 illustrates a block diagram of an example embodiment of a computing device.

FIG. 1 illustrates a block diagram of an example embodiment of a computing device 100. Referring to FIG. 1, computing device 100 may include various components such as, for example, processing logic 120, primary storage 130, secondary storage 150, one or more input devices 160, one or more output devices 170, and one or more communication interfaces 180.

It should be noted that FIG. 1 illustrates an example embodiment of computing device 100. Other embodiments of computing device 100 may include more components or fewer components than the components illustrated in FIG. 1. The components may be arranged differently than as illustrated in FIG. 1.

For example, in an embodiment of computing device 100, secondary storage 150 may be contained at a remote site that provides "cloud" storage. The site may be accessible to computing device 100 via a communications network, such as, for example, the Internet. A communication interface 180 may be used to interface the computing device 100 with the communications network.

Also, it should be noted that functions performed by various components contained in other embodiments of computing device 100 may be distributed among the components differently than as described herein.

Computing device 100 may include an input/output (I/O) bus 110 that may be used to communicate information between components in computing device 100. The information may include, for example, control signals and/or data. Examples of I/O buses that may be used to implement I/O bus 110 may include serial AT attachment (SATA), peripheral component interconnect (PCI), PCI express (PCIe), universal serial bus (USB), small computer system interface (SCSI), serial attached SCSI (SAS), or some other I/O bus.

Computing device 100 may include a memory bus 190 that may enable information, which may be stored in primary storage 130, to be transferred between processing logic 120 and primary storage 130. The information may include computer-executable instructions and/or data that may be executed, manipulated, and/or otherwise processed by processing logic 120.

Processing logic 120 may include logic for interpreting, executing, and/or otherwise processing information. The information may be stored in, for example, primary storage 130 and/or secondary storage 150. In addition, the information may be acquired by one or more input devices 160 and/or communication interfaces 180.

Processing logic 120 may include a variety of heterogeneous hardware. For example, the hardware may include some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), and/or other types of processing logic that may, for example, interpret, execute, manipulate, and/or otherwise process the information. Processing logic 120 may comprise a single core or multiple cores. An example of a processor that may be used to implement processing logic 120 is the Intel® Xeon® processor available from Intel Corporation, Santa Clara, Calif.

Input devices 160 may include one or more input devices that may be used to input information into computing device 100. The input devices may include, for example, a keyboard, computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, puck, eyeball controlled device, finger mouse, light pen, light gun, neural device, eye tracking device, steering wheel, yoke, jog dial, space ball, directional pad, dance pad, soap mouse, haptic device, tactile device, neural device, multipoint input device, discrete pointing device, and/or some other input device. The information may include spatial (e.g., continuous, multi-dimensional) data that may be input into computing device 100 using, for example, a pointing device, such as a computer mouse. The information may also include other forms of data, such as, for example, text that may be input using a keyboard.

Output devices 170 may include one or more output devices that may output information from computing device 100. The output devices may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, printer, speaker, video projector, volumetric display device, plotter, touch screen, and/or some other output device. Output devices 170 may be directed by, for example, processing logic 120, to output the information from computing device 100. Outputting the information may include presenting (e.g., displaying, printing) the information on an output device 170. The information may include, for example, text, graphical user interface (GUI) elements (e.g., windows, widgets, and/or other GUI elements), audio (e.g., music, sounds), and/or other information that may be outputted by output devices 170.

Communication interfaces 180 may include logic for interfacing computing device 100 with, for example, one or more communications networks and enable computing device 100 to communicate with one or more entities (e.g., nodes) coupled to the communications networks. The communications networks may include, for example, the Internet, wide-area networks (WANs), local area networks (LANs), 3G and/or 4G networks. Communication interfaces 180 may include one or more transceiver-like mechanisms that may enable computing device 100 to communicate with entities coupled to the communications networks. Examples of communication interfaces 180 may include a built-in network adapter, network interface card (NIC), Personal Computer Memory Card International Association (PCMCIA) network card, card bus network adapter, wireless network adapter, Universal Serial Bus (USB) network adapter, modem, and/or other device suitable for interfacing computing device 100 to a communications network.

Primary storage 130 and secondary storage 150 may include one or memory devices. A memory device may support, for example, serial or random access to information contained in the memory device. A memory device that supports serial access to information stored in the memory device may be referred to as a serial memory device. A memory device that supports random access to information stored in the memory device may be referred to as a random access memory (RAM) device.

A memory device may be, for example, volatile or non-volatile. A volatile memory device may be a memory device that may lose information stored in the device when power is removed from the device. A non-volatile memory device may be a memory device that may retain information stored in the device when power is removed from the device. Examples of memory devices may include dynamic RAM (DRAM) devices, flash memory devices, static RAM (SRAM) devices, zero-capacitor RAM (ZRAM) devices, twin transistor RAM (TTRAM) devices, read-only memory (ROM) devices, ferroelectric transistor RAM (FeTRAM) devices, magneto-resistive RAM (MRAM) devices, phase change memory (PCM) devices, PCM and switch (PCMS) devices, nanowire-based devices, resistive RAM devices (RRAM), serial electrically erasable programmable ROM (SEEPROM) devices, serial flash devices, and/or other types of memory devices.

Primary storage 130 may be accessible to processing logic 120 via memory bus 190. Primary storage 130 may include a non-transitory tangible computer readable medium that may store information for processing logic 120. The information may include, for example, computer-executable instructions and/or data that may implement operating system (OS) 132 and application (APP) 136. The computer-executable instructions may be executed, interpreted, and/or otherwise processed by processing logic 120. The computer-executable instructions and/or data may include computer-executable instructions and/or data that may implement one or more embodiments of the invention.

Primary storage 130 may be implemented using one or more memory devices that may store information for processing logic 120. The memory devices may include volatile and/or non-volatile memory devices.

OS 132 may be a conventional operating system that may implement various conventional operating system functions. The functions may include, for example, (1) scheduling one or more portions of APP 136 to run on (e.g., be executed by) processing logic 120, (2) managing primary storage 130, and/or (3) controlling access to various components in computing device 100 (e.g., input devices 160, output devices 170, communication interfaces 180, secondary storage 150) and information received and/or transmitted by these components.

Examples of operating systems that may be used to implement OS 132 may include the Linux operating system, Microsoft Windows operating system, the Symbian operating system, Mac OS operating system, and the Android operating system. A distribution of the Linux operating system that may be used is Red Hat Linux available from Red Hat Corporation, Raleigh, N.C. Versions of the Microsoft Windows operating system that may be used include Microsoft Windows Mobile, Microsoft Windows 8, Microsoft Windows 7, Microsoft Windows Vista, and Microsoft Windows XP operating systems available from Microsoft Inc., Redmond, Wash. The Symbian operating system is available from Accenture PLC, Dublin, Ireland. The Mac OS operating system is available from Apple, Inc., Cupertino, Calif. The Android operating system is available from Google, Inc., Menlo Park, Calif.

OS 132 may include one or more drivers 134. The drivers 134 may provide an interface between OS 132 and/or APP 136, and one or more devices that may be associated with components in computing device 100. These components may include, for example, input devices 160, output devices 170, communication interfaces 180, and/or secondary storage 150.

For example, a driver 134 may provide an interface between OS 132 and/or APP 136 and storage device 200. The driver 134 may contain provisions that enable the OS 132 and/or APP 136 to communicate with the storage device 200. Communication here may include, for example, writing information to storage device 200, reading information from storage device 200, acquiring a status of storage device 200, and so on.

APP 136 may be a software application that may execute under control of OS 132 on computing device 100. APP 136 and/or OS 132 may contain provisions for processing transactions that may involve writing and/or reading information in a storage device 200 in secondary storage 150. These provisions may be implemented using data and/or computer-executable instructions contained in APP 136 and/or OS 132.

Secondary storage 150 may include a storage device 200. The storage device 200 may be accessible to processing logic 120 via I/O bus 110. The storage device 200 may store information (e.g., data, computer-executable instructions). The information may be executed, interpreted, manipulated, and/or otherwise processed by processing logic 120. The information may include computer-executable instructions and/or data that may implement one or more embodiments of the invention.

Storage device 200 may include volatile or non-volatile storage for storing the information. Examples of devices that may be used to implement storage device 200 may include one or more magnetic disk drives, optical disk drives, RAM drives, flash drives, SSDs, hybrid drives, and/or other storage devices. The information may be stored on one or more non-transitory tangible computer-readable media contained in the storage devices. Examples of non-transitory tangible computer-readable media that may be contained in the storage devices may include magnetic discs, optical discs, volatile memory devices, and/or non-volatile memory devices.

Figure 2:
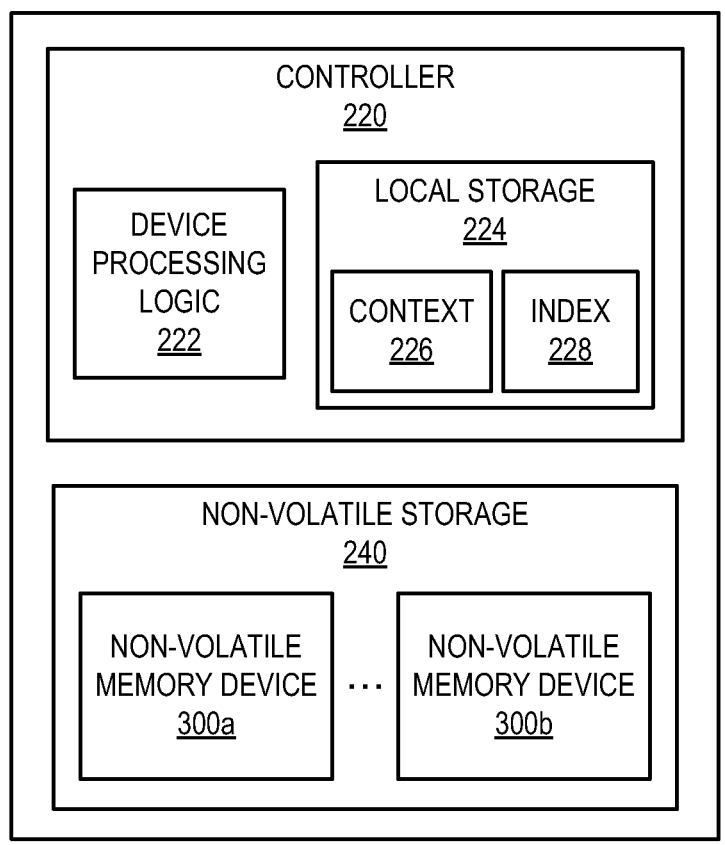
FIG. 2 illustrates an example embodiment of a storage device.

FIG. 2 illustrates an example embodiment of storage device 200. Referring to FIG. 2, storage device 200 may include controller 220 and a non-volatile storage 240. The controller 220 may include device processing logic 222 and a local storage 224. The non-volatile storage 240 may include one or more non-volatile memory devices 300.

The device processing logic 222 may include processing logic that may process information contained in local storage 224. The processing logic may include some combination of one or more processors, microprocessors, FPGAs, ASIPs, ASICs, CPLDs, and/or other types of processing logic that may, for example, interpret, execute, manipulate, and/or otherwise process the information. For example, the local storage 224 may store computer-executable instructions that may be executed by device processing logic 222 to write and/or read information in non-volatile storage 240 and/or perform other functions and/or operations that may be associated with storage device 200.

Local storage 224 may include a volatile and/or non-volatile storage that may be used to store the information that may be processed by device processing logic 222. The information may include data and/or computer-executable instructions that may be associated with an operation of storage device 200.

Storage device 200 may support logical blocks, which may be used to store information in storage device 200. A logical block may be associated with an LBA that may be used to identify the logical block. Information stored in a logical block may be accessed (e.g., read, written) by processing logic 120 (FIG. 1) using an LBA associated with the logical block.

A logical block may be associated with a physical block that may be contained in non-volatile storage 240. The physical block may be associated with a PBA that may be used to identify the physical block. The physical block may physically store information associated with the logical block in the non-volatile storage 240.

Local storage 224 may include context 226, which may contain context information that may be associated with storage device 200. The context information may include, for example, an L2P table that may contain information that may be used by device processing logic 222 to translate an LBA to a PBA.

For example, suppose processing logic 120 issues a command to read information in a logical block in storage device 200 that is associated with LBA "0". Further suppose that an L2P table in context 226 contains an entry that indicates that LBA "0" corresponds to physical block "16" in non-volatile storage 240. Storage device 200 may acquire the command and process it. Processing may include accessing the entry in the L2P table to identify that LBA "0" corresponds to physical block "16". Thus, in response to the command issued by processing logic 120, storage device 200 may read the information stored at physical block "16" in storage device 200 and return the read information to processing logic 120.

A tag may be associated with one or more blocks (e.g., logical blocks, physical blocks) that may be contained in a storage device, such as storage device 200. The tag may include, for example, an identifier (ID) and other information (e.g., access privileges). As will be described further below, the ID may be used to determine whether an entity (e.g., a user, an application) is associated with the one or more logical blocks. As will also be described further below, other information in the tag may be used to, for example, (1) identify rights (e.g., access rights) that the entity may have with respect to the one or more logical blocks, (2) specify an encryption technique (scheme) for information contained in the one or more logical blocks, (3) associate keywords with information contained in the one or more logical blocks, (4) specify a security level associated with information contained in the one or more logical blocks, and/or (5) describe a content of information contained in the one or more logical blocks.

Index 228 may, for example, contain information that may associate one or more tags with one or more blocks in storage device 200. Index 228 may be organized as a data structure (e.g., a table) that may contain one or more entries that may be used to establish associations between tags and blocks.

For example, suppose storage device 200 includes a first set of logical blocks and a second set of logical blocks. Further, suppose a first tag is associated with the first set of logical blocks and a second tag is associated with the second set of logical blocks. Index 228 may be organized as a data structure having a first entry that may associate the first tag with the first set of logical blocks and a second entry that may associate the second tag with the second set of logical blocks.

The non-volatile storage 240 may provide storage for information stored on storage device 200. The storage may be non-volatile. The information may be provided, for example, by processing logic 120.

Non-volatile storage 240 may contain one or more non-volatile memory devices 300*a-b* that may be used to store the information. Examples of devices that may be used to implement a non-volatile memory device 300 may include flash memory devices, PCM devices, PCMS devices, NAND memory devices, or other non-volatile storage devices.

A non-volatile memory device 300 may store the information in physical blocks contained in the non-volatile memory device 300. A physical block may be a minimum sized unit that may be written in the non-volatile memory device 300. A physical block may be fixed in size (e.g., 2048 bytes). Physical blocks may be organized into erase blocks (EBs), where an EB may include one or more physical blocks.

An EB may be a type of block that is associated with a group of one or more physical blocks that may be erased as a group. For example, suppose non-volatile memory device 300 includes sixty-four physical blocks which are divided into eight EBs where each EB includes eight different physical blocks. Erasing an EB may cause all eight physical blocks associated with the EB to be erased.

Figure 3:
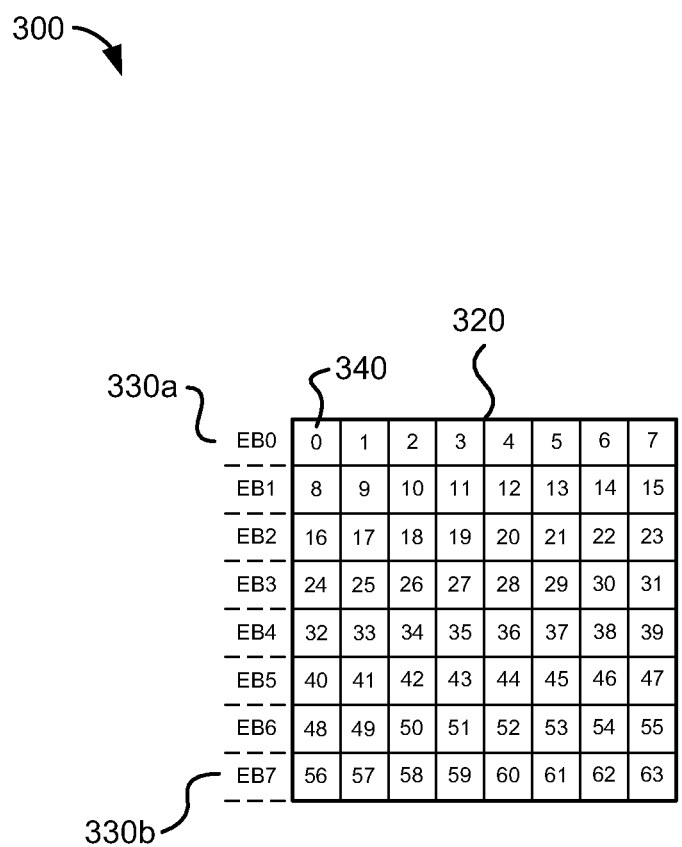
FIG. 3 illustrates an example layout of a non-volatile memory device that may be contained in a storage device.

FIG. 3 illustrates an example layout of non-volatile memory device 300. Referring to FIG. 3, non-volatile memory device 300 may include a die 320. The die 320 may contain one or more EBs 330 wherein an EB 330 may contain one or more physical blocks 340. The physical blocks may also be referred to as physical pages. In the example layout illustrated in FIG. 3, die 320 includes eight EBs (labeled "EB0" through "EB7") and sixty-four physical blocks (numbered "0" through "63"). Further, an EB 330 includes eight physical blocks. Thus, for example, EB 330*a* includes eight physical blocks numbered "0" through "7". Likewise, for example, EB 330*b* includes eight physical blocks numbered "56" through "63".

It should be noted that the layout illustrated in FIG. 3 is an example layout of an embodiment of non-volatile memory device 300. Other embodiments of non-volatile memory device 300 may include other layouts. For example, other embodiments of non-volatile memory device 300 may include more dies, EBs, and/or physical blocks, or fewer EBs and/or physical blocks than what is illustrated in FIG. 3.

As noted above, a tag may be associated with one or more blocks contained in a storage device. The tag may include, for example, an ID and other information. The ID may identify an entity (e.g., an application, a user) associated with the one or more blocks. The other information may include information that may describe a relationship between the entity and the one or more blocks. For example, the other information may include information about access rights that the entity has to the one or more blocks. The other information may include information that may be related to the contents of the one or more blocks. For example, the other information may include key words that may be associated with a data that may be stored in the one or more blocks.

Figure 4:
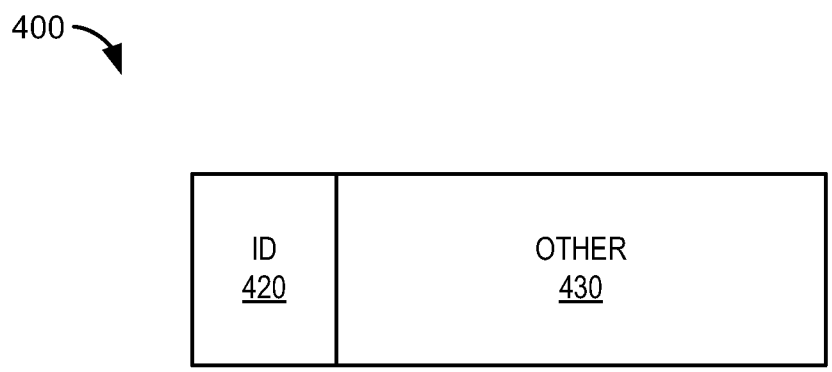
FIG. 4 illustrates an example embodiment of a tag that may be associated with one or more blocks contained in a storage device.

FIG. 4 illustrates an example embodiment of a tag 400 that may be associated with one or more blocks contained in a storage device. Referring to FIG. 4, the tag 400 may include an ID field 420 and an other field 430. The ID field 420 may be used to hold an ID that may identify an entity (e.g., an application, a user) that may be associated with the one or more blocks. The other field 430 may include information that may describe a relationship between the entity and the one or more blocks.

Figure 5:
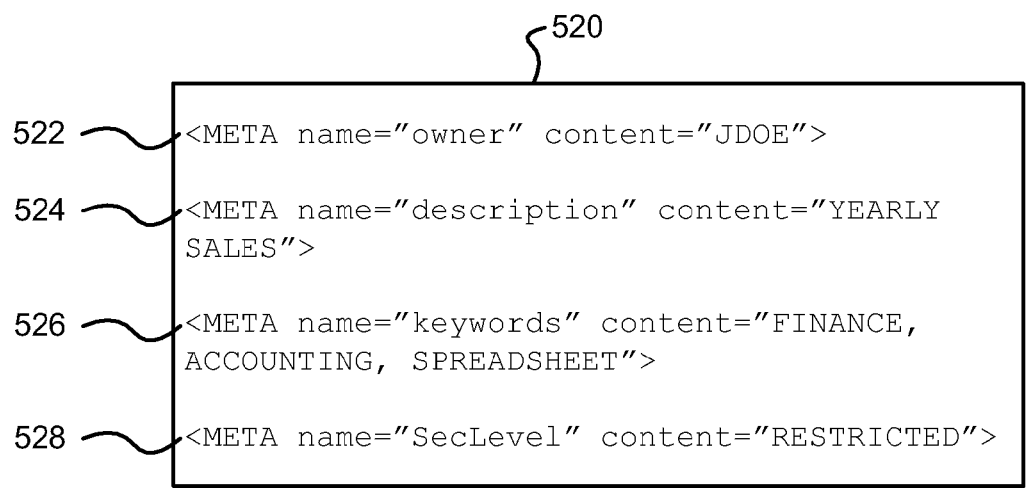
FIG. 5 illustrates examples of tags that may be associated with one or more blocks contained in a storage device.
Figure 5:
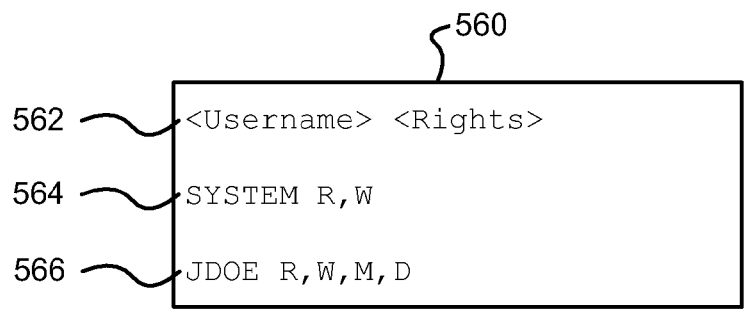

FIG. 5 illustrates example embodiments of tag 400. Referring to FIG. 5, block 520 illustrates an example embodiment of tag 400 that involves metadata. The metadata may include multiple entries where an entry may include a name field and a content field. The name field may contain information that describes the contents of the content field. The content field may include content (e.g., data) associated with the entry. In block 520, line 522 may include information that may be contained in an ID field 420 of a tag 400. Lines 524 through 528 may include information that may be contained in the other field 430 of the tag 400.

For example, suppose that tag 400 is associated with one or more blocks in storage device 200. Line 522 contains a name field that is set to the value "owner" and a content field that is set to the value "JDOE". Here, the name field indicates that the content field contains an owner associated with the blocks in storage device 200. In this example, the owner is identified as "JDOE".

Line 524 contains a name field that is set to "description" and a content field that is set to "YEARLY SALES". The name field may indicate that the content field contains a description of information that may be stored in the blocks in storage device 200. In this example, the content field contains the value "YEARLY SALES". Thus, the information stored in the blocks may be related to, for example, yearly sales of an organization.

Line 526 contains a name field that is set to "keywords" and a content field that is set to "FINANCE, ACCOUNTING, SPREADSHEET". Here, the name field may indicate that the content field contains keywords related to the information stored in the blocks in storage device 200. The keywords may be used, for example, when searching for information contained in the blocks.

Line 528 contains a name field that is set to "SecLevel" and a content field that is set to "RESTRICTED". Here, the name field may indicate that the content field contains a security level associated with the information stored in the blocks in storage device 200. The value of the content field (i.e., "RESTRICTED") may indicate that the information may be accessed, for example, only by entities (e.g., users, applications) that have privileges that enable them to access information at that security level.

Block 560 illustrates another example embodiment of tag 400 that includes "Username" and "Rights" information. In block 560, line 562 illustrates an example format that may be used in this example embodiment. The format includes "Username" and "Rights" information. The "Username" information may be contained in the ID field 420 of the tag 400 and the "Rights" information may be contained in the other field 430 of the tag.

The "Username" information may include an ID that may be associated with a user. The "Rights" information may include privileges (e.g., access privileges) that may be, for example, afforded to the user. The privileges may include, for example, permission to read, write, modify, and/or delete information contained in one or more blocks associated with the tag 400.

Lines 564 and 566 illustrate examples of tags 400 that utilize the format illustrated at line 562. Specifically, at line 562, a first tag 400 may indicate that a user assigned the username "SYSTEM" may be granted privileges that may include read and write access (indicated by "R" and "W", respectively) to blocks associated with the first tag 400. At line 566, a second tag 400 may indicate that a user assigned the user name "JDOE" may be granted privileges that may include read, write, modify, and delete (indicated by "R", "W", "M", and "D", respectively) to blocks associated with the second tag 400.

A tag 400 may be stored in one or more blocks that may be associated with tag 400. The tag 400 may be read when processing requests to access the one or more blocks. The tag 400 may be used, for example, to determine whether the requests should be allowed or denied.

For example, suppose a tag 400 and information (e.g., data) is stored in a physical block 340 associated with a logical block in storage device 200. Further, suppose APP 136 issues a request to read the information stored in the logical block. Controller 220 may receive the request and process it. Processing may include determining whether APP 136 has privileges to read the logical block.

Specifically, controller 220 may read the tag 400 from the physical block 340 associated with the logical block. Controller 220 may compare an ID associated with APP 136 to an ID contained in the tag 400 (e.g., in the ID field 420). Controller 220 may determine whether the ID associated with the APP 136 matches the ID contained in the tag 400.

Suppose the IDs match. Controller 220 may determine whether the request should be allowed based on the nature of the request and/or information contained in the tag 400. Suppose that the tag 400 indicates in its other field 430 that entities associated with the ID may read the information stored in the logical block. The controller 220 may determine that the request is to be allowed based on this determination. Allowing the request may include the controller 220 reading the information stored in the block. The read information may be returned to the APP 136.

It should be noted that the embodiments illustrated in blocks 520 and 560 are example embodiments of tag 400 and that other embodiments of tag 400 may include more information or less information than illustrated in blocks 520 and 560. For example, other embodiments of tag 400 may include information about encryption methods that may be used to encrypt information that may be contained in blocks associated with the tag 400 and/or other information, such as whether a user particular user may execute information contained in the blocks.

An entity, such as an application, may issue a command to access (e.g., read, write) a block in a storage device. The command may be acquired, for example, by a controller contained in the storage device. The entity may be associated with a tag and information may be stored in the storage device that associates the tag with the block. The information may be used to associate the entity with the block.

Figure 6:
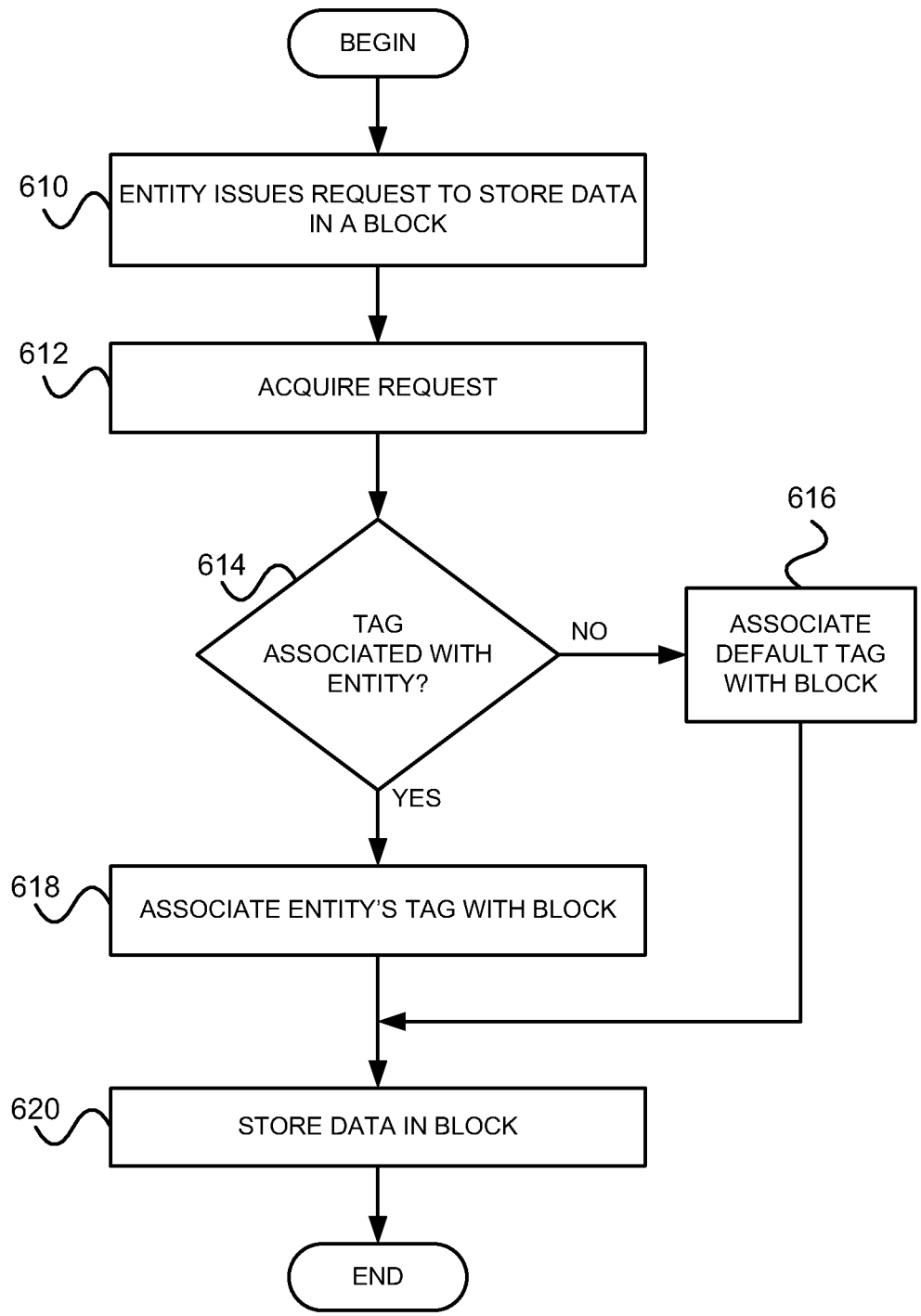
FIG. 6 illustrates a flow chart of example acts that may be used to store information in a storage device.

FIG. 6 illustrates a flowchart of example acts that may be used to store data and a tag in a storage device. Referring to FIG. 6, at block 610, a request may be issued to store the data in a block contained in the storage device. The request may be, for example, a command that may be issued by an entity to write data to a block that may be contained in the storage device.

At block 612, the request may be acquired. For example, the request may be issued by an application that may be executing in a computing device under control of an operating system. The operating system may acquire the command from the application and transfer the command to a driver associated with the storage device. The driver may acquire the command from the operating system. The driver may forward the command to the storage device, which may acquire the command at a controller contained in the storage device.

At block 614, a check may be performed to determine whether the entity is associated with a tag. The tag may include, for example, an ID and other information. The ID may identify the entity and the other information may include information related to the data to be stored in the block.

For example, the application may be associated with the tag. The tag may be forwarded to the storage which may acquire the tag. The controller in the storage device may acquire the tag and determine that the application is associated with a tag.

If it is determined that the entity is not associated with a tag, at block 616 a default tag may be associated with the block. The default tag may be a predefined tag that may contain, for example, a default ID and information related to the default ID (e.g., default access privileges). If at block 614 it is determined that the entity is associated with a tag, at block 618 the tag associated with the entity may be associated with the block.

Information that associates the tag with the block may be maintained by (e.g., stored in) the storage device. For example, continuing the above example, the controller may associate the tag with the block using an index, such as index 228 (FIG. 2). Associating the tag with the block may include, for example, creating an entry in the index that associates the tag and with the block. The index may be stored in the storage device. In another example, information that associates the tag with the block may be stored in the block.

Information that associates the tag with the block may contain, for example, tag information and an address that may identify the block. The address may include, for example, a physical block address or a logical block address that may be associated with the block.

At block 620, the data is stored in the block. The data may be stored in the block by writing the data to the block.

For example, referring to FIGS. 1-4 and 6, suppose APP 136 generates a request to write data to a logical block in storage device 200. Further suppose that the logical bock corresponds to physical block 340 and that APP 136 is associated with a tag 400. APP 136 may issue the request to OS 132. OS 132 may receive the request and transfer the request to driver 134. Driver 134 may receive the request and process it. Processing may include, for example, transferring the tag 400 and data to storage device 200 and directing storage device 200 to write the data in the storage device 200 at a location specified by the logical block.

Storage device 200 may receive the request, tag 400, and data from the driver 134. Device processing logic 222 may identify a physical block in non-volatile storage 240 that corresponds to the logical block. Suppose that device processing logic 222 identifies that physical block 340 corresponds to the logical block. Device processing logic 222 may write the data to physical block 340. Device processing logic 222 may update index 228 to associate the tag 400 with physical block 340 and/or the logical block.

Note that various processing may be performed based on information contained in a tag. For example, in the above example, tag 400 may include an indication that the data is to be written to the storage device 200 in an encrypted form. Here, the tag 400 may specify an encryption technique that may be used to encrypt the data. Device controller 220 may encrypt the data according to the technique and write the encrypted data to physical block 340.

In another example, information contained in a tag may be used to establish access rights associated with a logical block that is written. For example, suppose in the above example that the logical block is being written for the first time after being erased. The tag may contain access rights information that may identify one or more entities that may access the block after the block is written. Moreover, the tag may include information that may indicate a type of access (e.g., read, write, delete) that may be permitted.

Figure 7:
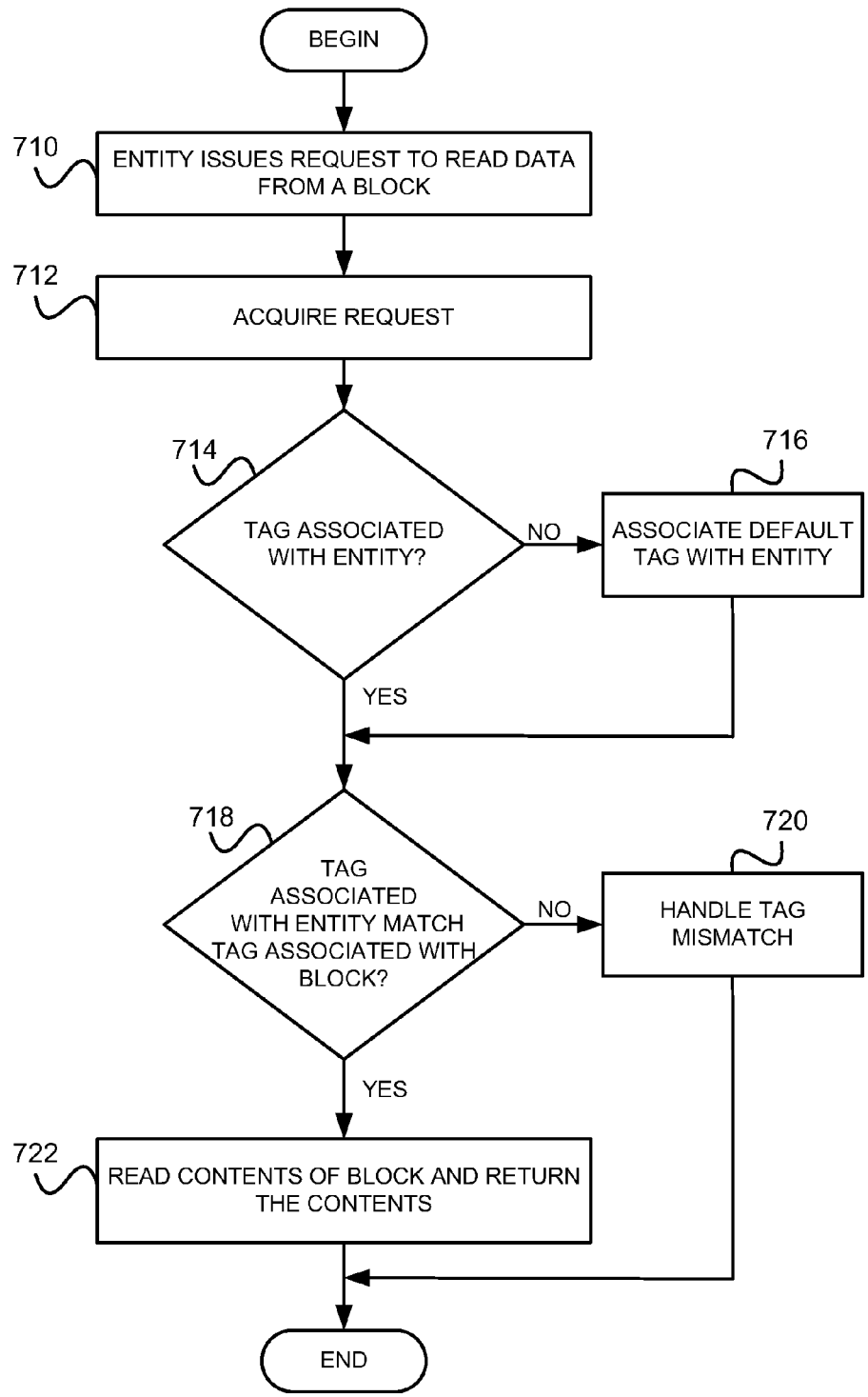
FIG. 7 illustrates a flow diagram of example acts that may be used to acquire information that is stored in a storage device.

FIG. 7 illustrates a flow diagram of example acts that may be used to acquire information that is stored in a storage device. Referring to FIG. 7, at block 710, an entity issues a request to read data from a block in the storage device. At block 712, the request is acquired. At block 714, a check is performed to determine whether a tag is associated with the entity. If a tag is not associated with the entity, at block 716, a default tag is associated with the entity.

At block 718, a check is performed to determine whether the tag associated with the entity matches a tag associated with the block in the storage device. If the tags do not match, at block 720, the mismatch is handled. The mismatch may be handled, for example, by indicating an error condition in a response to the request (e.g., error status, error code). If at block 718, it is determined that the tags match, at block 722, the contents of the block in the storage device is read and returned.

For example, referring to FIGS. 1-4 and 7, suppose that APP 136 issues a command to read data from a logical block in storage device 200. Further, suppose that the logical block corresponds to physical block 340. OS 132 may receive the request and forward the request to driver 134. Driver 134 may receive the request from OS 132 and determine whether APP 136 is associated with a tag 400.

Suppose that driver 134 determines that APP 136 is associated with a tag 400. Driver 134 may transfer the tag 400 to storage device 200. In addition, driver 134 may direct storage device 200 to read the contents of the logical block. Device processing logic 222 may receive the tag 400 and access index 228 to determine whether the tag 400 matches tag information about the logical block.

Suppose that device processing logic 222 determines that the tags match. Device processing logic 222 may determine that physical block 340 is associated with the logical block. Device processing logic 222 may read the contents of physical block 340 and return the contents over bus 110 to driver 134. Driver 134 may transfer the contents to APP 136 via OS 132.

Figure 8:
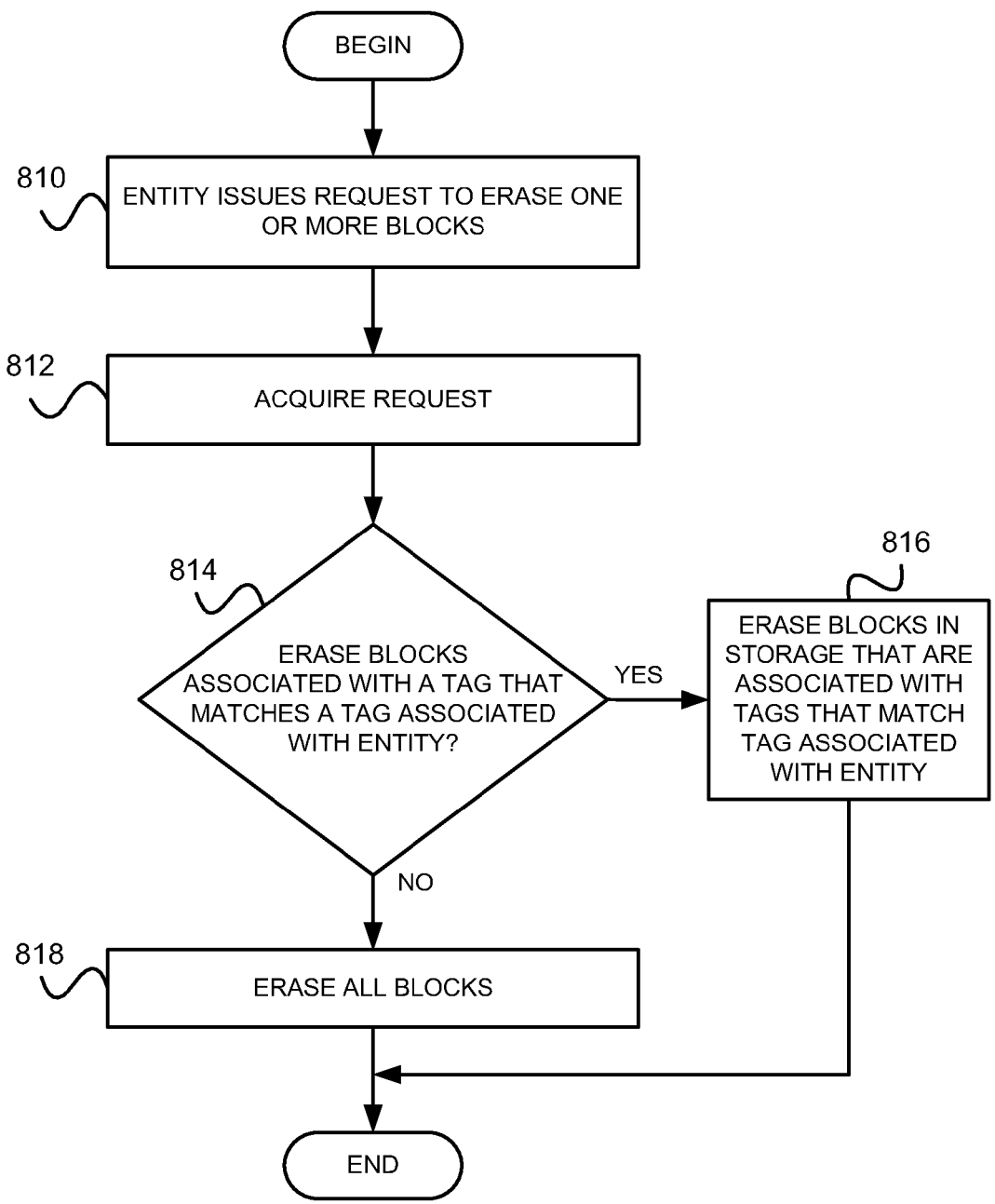
FIG. 8 illustrates a flow diagram of example acts that may be used to erase information that is stored in a storage device.

A tag may be used to identify one or more blocks that may be erased in a storage device. FIG. 8 illustrates a flow chart of example acts that may be used to erase one or more blocks in a storage device where the one or more blocks may be identified based on a tag associated with an entity.

Referring to FIG. 8, at block 810, an entity may issue a request to erase one or more blocks in the storage device. For example, the entity may be an application, such as APP 136, and the blocks may be contained in storage device 200. APP 136 may issue a command to erase the blocks in the storage device 200.

At block 812, the request is acquired. For example, APP 136 may issue the command to OS 132. The operating system may receive the command from APP 136 and forward the command to driver 134. The driver 134 may receive the command from OS 132.

At block 814, a check is performed to determine whether the request indicates to erase blocks in the storage device that are associated with a tag that matches a tag associated with the entity. Continuing the above example, after receiving the command from the OS 132, the driver 134 may, for example, process the request. Processing may include determining whether the command indicates that blocks to be erased are blocks that are associated with a tag that matches a tag associated with the entity.

If at block 814 it is determined that the request indicates to erase blocks in the storage device that are associated with a tag that matches a tag associated with the entity, at block 816, blocks in storage that are associated with a tag that matches the tag associated with the entity are erased. Otherwise, at block 818 all blocks in the storage may be erased. Here, "all blocks in the storage may be erased" may include, for example, erasing blocks in the storage device regardless of whether they are associated with tags that match the tag associated with the entity.

For example, referring to FIGS. 1-4 and 8, suppose that APP 136 is associated with a tag 400. Further, assume APP 136 issues a command to erase all logical blocks in storage device 200 that are associated with the tag 400. OS 132 may receive the command from APP 136 and forward the command to driver 134. Driver 134 may receive the command from OS 132 and determine that the command indicates that all logical blocks in storage device 200 that are associated with the tag 400 are to be erased.

Driver 134 may transfer the tag 400 to storage device 200. In addition, driver 134 may direct storage device 200 to erase all blocks associated with the tag 400. Device processing logic 222 may receive the tag 400 and process the request. Processing may include, for example, (1) searching index 228 to identify blocks in non-volatile storage 240 that are associated with the tag 400 and (2) erasing the identified blocks.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 6, 7, and 8, the order of the acts may be modified in other implementations. Further, non-dependent acts may be performed in parallel.

Also, the term "user", as used herein, is intended to be broadly interpreted to include, for example, a computing device (e.g., fixed computing device, mobile computing device) or a user of a computing device, unless otherwise stated.

It will be apparent that one or more embodiments, described herein, may be implemented in many different forms of software and/or hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain features of the invention may be implemented using computer-executable instructions that may be executed by processing logic, such as processing logic 120 and/or device processing logic 222. The computer-executable instructions may be stored on one or more non-transitory tangible computer-readable storage media. The media may be volatile or non-volatile and may include, for example, DRAM, SRAM, flash memories, removable disks, non-removable disks, and so on.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A method comprising:
   acquiring a command issued by an entity to store data in a block of a non-volatile storage contained in a storage device, the command being acquired by a controller contained in the storage device, the controller having a local storage, the entity being associated with a tag, the tag including: a first field and a second field, the first field containing information that identifies a content of information contained in the second field, and the second field containing information that relates to the data to be stored in the block;
   storing, in the local storage, information that associates the tag with the block; and
   storing the data in the block.

2. The method of claim 1, further comprising:
   acquiring the tag from the entity.

3. The method of claim 1, wherein the tag is a default tag.

4. The method of claim 1, wherein the entity is an application that executes in a computing device.

5. The method of claim 4, wherein the storage device is contained in the computing device.

6. The method of claim 1, wherein the information associating the tag with the block includes an address that identifies the block.

7. The method of claim 6, wherein the address is a physical block address or a logical block address associated with the block.

8. The method of claim 1, wherein the information that associates the tag with the block is stored in the block.

9. The method of claim 1, wherein the information that associates the tag with the block is stored in an index that is maintained by the controller, and
   wherein the index is contained in the local storage.

10. The method of claim 1, wherein the entity is an application that is executed by processing logic contained in a computing device.

11. The method of claim 1, wherein the tag further includes an identifier.

12. The method of claim 11, wherein the identifier includes a username associated with the entity.

13. The method of claim 1, wherein the information in the second field identifies an encryption technique for encrypting the data, and
    wherein storing the data in the block further comprises:
       encrypting the data in accordance with the encryption technique; and
       writing the encrypted data to the block.

14. A storage device comprising:
    a non-volatile data storage containing one or more blocks for storing data; and
    processing logic for:
       acquiring a command issued by an entity to write data to a block contained in the storage, the entity being associated with a tag, the tag including a first field and a second field, the first field containing information that identifies a content of information contained in the second field, and the second field containing information that relates to the data to be stored in the block, and
       storing information that associates the tag with the block in the storage device.

15. The storage device of claim 14, wherein the storage device is contained in a computing device and the entity is an application that executes in the computing device.

16. The storage device of claim 14, wherein the information that associates the tag with the block is stored in the block.

17. The storage device of claim 14, further comprising:
    a local storage,
    wherein the information that associates the tag with the block is stored in the local storage.

18. The storage device of claim 17, wherein the information that associates the tag with the block is stored in an index contained in the local storage.

19. The storage device of claim 14, wherein the information contained in the second field includes a username associated with the entity.

20. The storage device of claim 14, wherein the tag further includes an identifier.

* * * * *